United States Patent [19]

Johnson et al.

[11] Patent Number: 5,480,619
[45] Date of Patent: Jan. 2, 1996

[54] REGENERATIVE SCRUBBER APPLICATION WITH CONDENSING HEAT EXCHANGER

[75] Inventors: Dennis W. Johnson, Barberton; Pervaje A. Bhat, North Canton, both of Ohio

[73] Assignee: The Babcock & Wilcox Company, New Orleans, La.

[21] Appl. No.: 267,263

[22] Filed: Jun. 28, 1994

[51] Int. Cl.[6] ................................................. B01D 53/18
[52] U.S. Cl. ............................................ 422/168; 422/170
[58] Field of Search ..................................... 422/168, 170, 422/171, 177

[56] References Cited

U.S. PATENT DOCUMENTS

| | | | |
|---|---|---|---|
| 3,638,708 | of/1972 | Farin | 159/47 WL |
| 4,431,617 | of/1984 | Farin | 423/232 |
| 4,487,139 | of/1984 | Warner | 110/345 |
| 4,526,112 | of/1985 | Warner | 110/345 |
| 4,557,202 | of/1985 | Warner | 110/216 |
| 4,577,380 | of/1986 | Warner | 29/157.3 |
| 4,669,530 | of/1987 | Warner | 165/1 |
| 4,705,101 | of/1987 | Warner | 165/104.31 |
| 4,776,391 | of/1988 | Warner | 165/111 |
| 5,160,707 | 11/1992 | Murray et al. | 422/170 |

OTHER PUBLICATIONS

"Utility Seeks to Integrate Heat Recovery Flue Gas Treatment," *Power*, May, 1993.
Rochelle, Gary, "Process Alternates for Stack Gas Desulfurization With Steam Regeneration to Produce $SO_2$", EPA Symp. 1977.

*Primary Examiner*—Timothy M. McMahon
*Attorney, Agent, or Firm*—Daniel S. Kalka; Robert J. Edwards

[57] ABSTRACT

A combined regenerative scrubber and condensing heat exchanger system comprises a housing having an inlet and an outlet for channeling flue gas into and out of the housing. A first heat exchanger is located in the housing for contacting a downward flow of the flue gas for providing an initial cooling of the flue gas. The flue gas is channeled through a second heat exchanger in an upward direction for providing a further cooling of the flue gas. A reagent scrubbing spray device is used to spray reagent into the flue gas as well as onto the second heat exchanger for removing $SO_2$ from the flue gas and for cleaning the second heat exchanger. A regeneration device is used to regenerate reagent from the reaction product as well as to recover $SO_2$ from the reaction product.

3 Claims, 3 Drawing Sheets

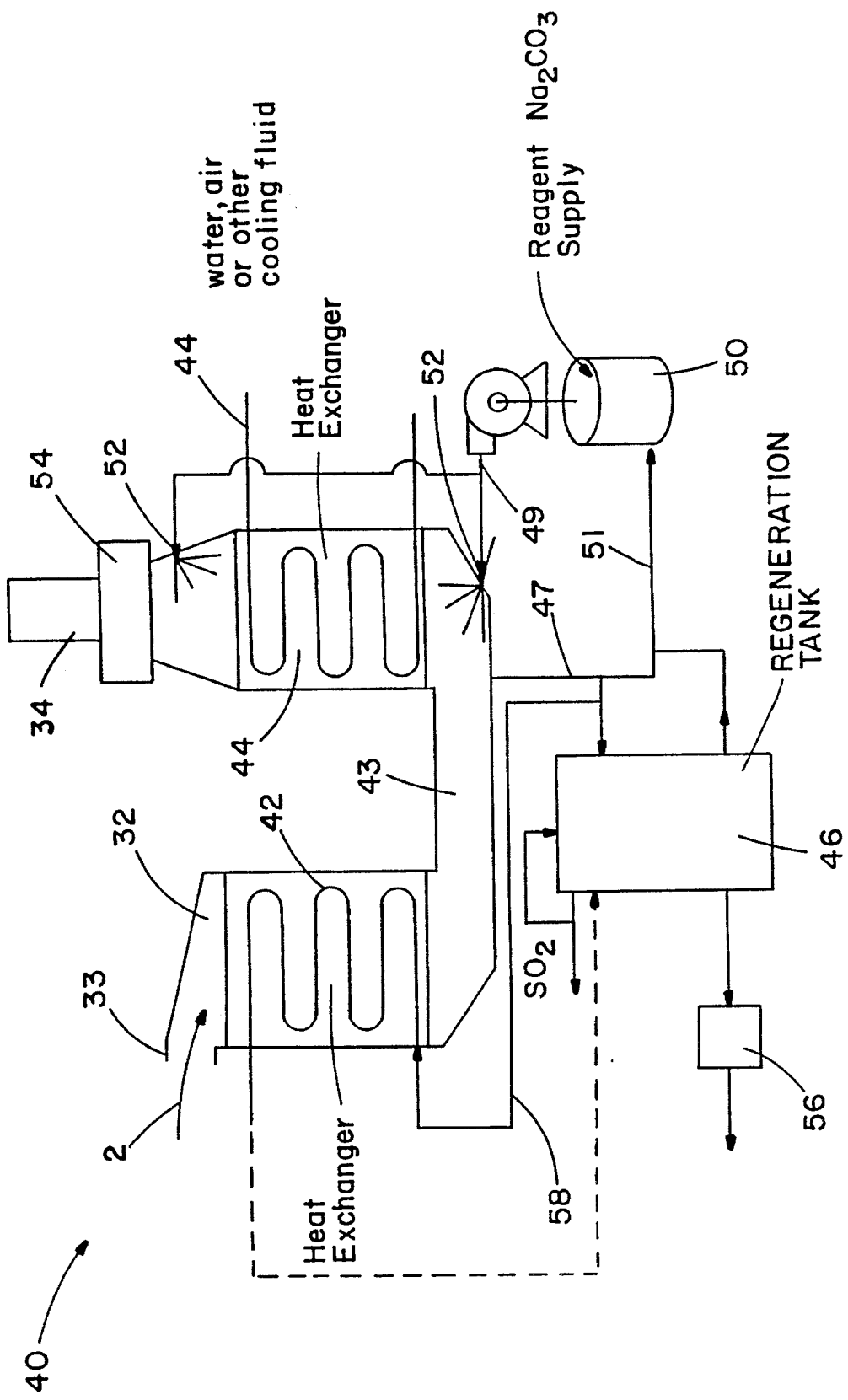

REGENERATIVE SCRUBBER APPLICATION WITH CONDENSING HEAT EXCHANGER

BACKGROUND OF THE INVENTION

1. Field of the Invention

The present invention relates, in general, to the removal of contaminants from flue gas and in particular to a new and useful system and method for removing $SO_2$ from a heat exchanger in a regenerative scrubber system.

2. Description of the Related Art

There are several systems used for removing contaminants from flue gas. Many of these systems which pertain to the removal of sulfur oxides ($SO_2$) and other contaminants are disclosed in Power Magazine published in May, 1993. In these systems, slurry-based sorbent is employed in a once-through system in order to remove sulfur oxides, particulates and mercury from flue gases; and the reaction products are then drained for discharge treatment.

There are also a number of known regenerable processes used for flue gas desulfurization. These include sodium based systems such as SOXAL (trademark owned by Allied Corporation, AQUATECH Systems), the Wellman-Lord process, the citrate process, and MgO process. Wet regenerable processes generally have an absorption step in which fresh or regenerated reagent is reacted with $SO_2$ in order to clean the flue gas. The products of the $SO_2$ absorption reaction are then sent to a regeneration system which generally involves the addition of heat to produce an $SO_2$ rich gas that can be further treated to produce sulfur, sulfuric acid or $SO_2$. The reagent is produced, i.e. regenerated for reuse in the $SO_2$ absorption process. For a sodium scrubber, the general reactions involved are:

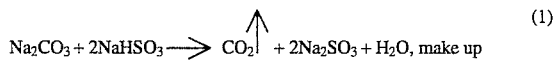
$$Na_2CO_3 + 2NaHSO_3 \longrightarrow CO_2\uparrow + 2Na_2SO_3 + H_2O, \text{ make up} \quad (1)$$

$$Na_2SO_3 + SO_2 + H_2O \longrightarrow 2NaHSO_3, \text{ absorption} \quad (2)$$

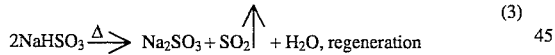
$$2NaHSO_3 \xrightarrow{\Delta} Na_2SO_3 + SO_2\uparrow + H_2O, \text{ regeneration} \quad (3)$$

The regeneration for these processes is complicated and consumes a large amount of energy.

Similar systems, known as dual-alkali processes, use one reagent (generally sodium carbonate/sodium sulfite) to absorb $SO_2$. The product of this reaction (sodium bisulfite) is then reacted with lime or limestone to form calcium sulfite and calcium sulfate in order to regenerate the reagent. These dual-alkali processes produce a sludge that must be land-filled or converted to a useful form. The reactions for the dual alkali process using limestone and lime are found in the following reactions:

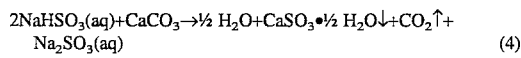
$$2NaHSO_3(aq)+CaCO_3 \rightarrow \tfrac{1}{2} H_2O+CaSO_3 \cdot \tfrac{1}{2} H_2O\downarrow+CO_2\uparrow+ \\ Na_2SO_3(aq) \quad (4)$$

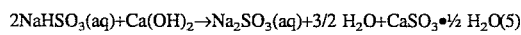
$$2NaHSO_3(aq)+Ca(OH)_2 \rightarrow Na_2SO_3(aq)+3/2 \, H_2O+CaSO_3 \cdot \tfrac{1}{2} H_2O \quad (5)$$

Non-regenerated flue gas desulfurization (FGD) systems are generally calcium based. In these systems, lime or limestone is reacted with $SO_2$. The end product is often a sludge similar to that produced by dual-alkali systems.

SUMMARY OF THE INVENTION

The present invention relates to a regenerative type scrubber that is integrated with a condensing heat exchanger (CHX®). The system according to the present invention is essential to remove $SO_2$ from a Teflon® coated tube heat exchanger using a scrubbing solution essentially without suspended solids and for regenerating alkali for make-up. By-product $SO_2$ is recovered and further processed to market higher concentrate $SO_2$, sulfur, or sulfuric acid.

The present invention is a system and method for removing $SO_2$ from flue gas which utilizes a housing having an inlet and an outlet for channeling the flue gas into and out of the housing. The flue gas is channeled downwardly through the housing through a first condensing heat exchanger which contacts the downward flow of flue gas in order to cool the flue gas. The flue gas is then channeled to a second condensing heat exchanger in an upward direction within the housing for providing a further cooling of the flue gas. A reagent scrubbing spray device is utilized for spraying the flue gas in order to remove $SO_2$ from the flue gas by forming a reaction product. The reagent is also sprayed on at least one of the condensing heat exchangers, preferably, the second heat exchanger. A regeneration system is used for regenerating the reagent from the reaction product for reuse in the reagent scrubbing device. $SO_2$ is also recovered from the reaction product for other purposeful uses.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic view illustrating a regenerable and heat exchanger system according to the present invention.

DESCRIPTION OF THE PREFERRED EMBODIMENT

Figure 1:
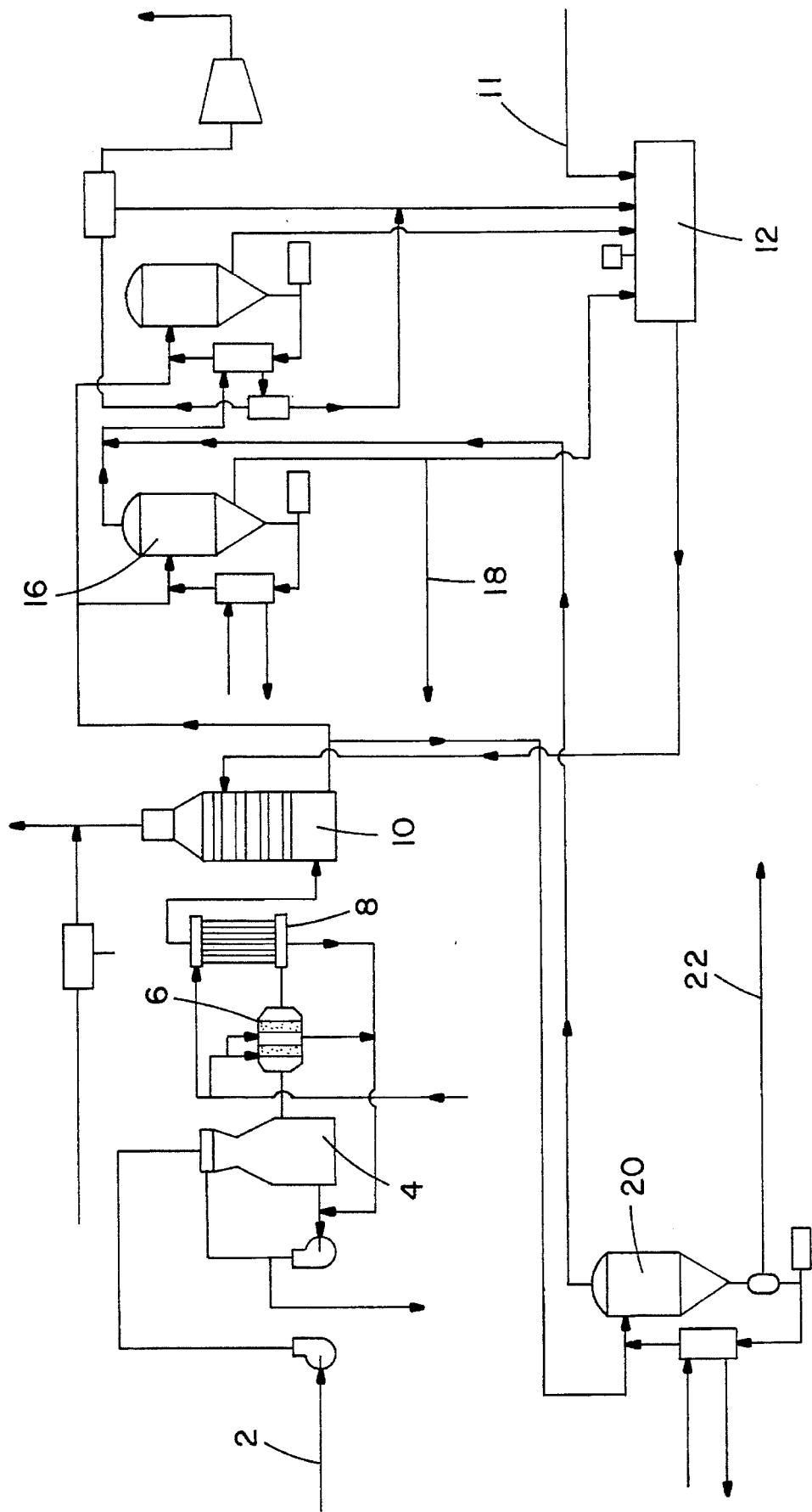
FIG. 1 is a schematic view illustrating a known regeneration process for the desulfurization of a flue gas.

FIG. 1 illustrates a known regenerative flue gas desulfurization process, commonly known as the Wellman-Lord process. This system channels incoming flue gas 2 into a scrubber reactor 4 for scrubbing the flue gas. After scrubbing, the flue gas 2 is channeled through a mist eliminator 6 which demists the flue gas 2. A precipitator 8, such as a wet electrostatic precipitator, is used to electrostatically remove remaining particles from the flue gas 2, and after which, the flue gas 2 is channeled to an absorber reactor 10 which receives a quantity of reagent 11, such as soda ash, from reagent dissolving tank 12. Thiosulfate 18 and $SO_2$ are removed from the reaction product produced by the absorber 10, by evaporators 16. At least one of the evaporators 16 separates thiosulfate 18 from the reaction product and provides it to the dissolving tank 12. A sulfate crystallizer 20 is also used to separate sulfate 22 from the reaction product.

Figure 2:
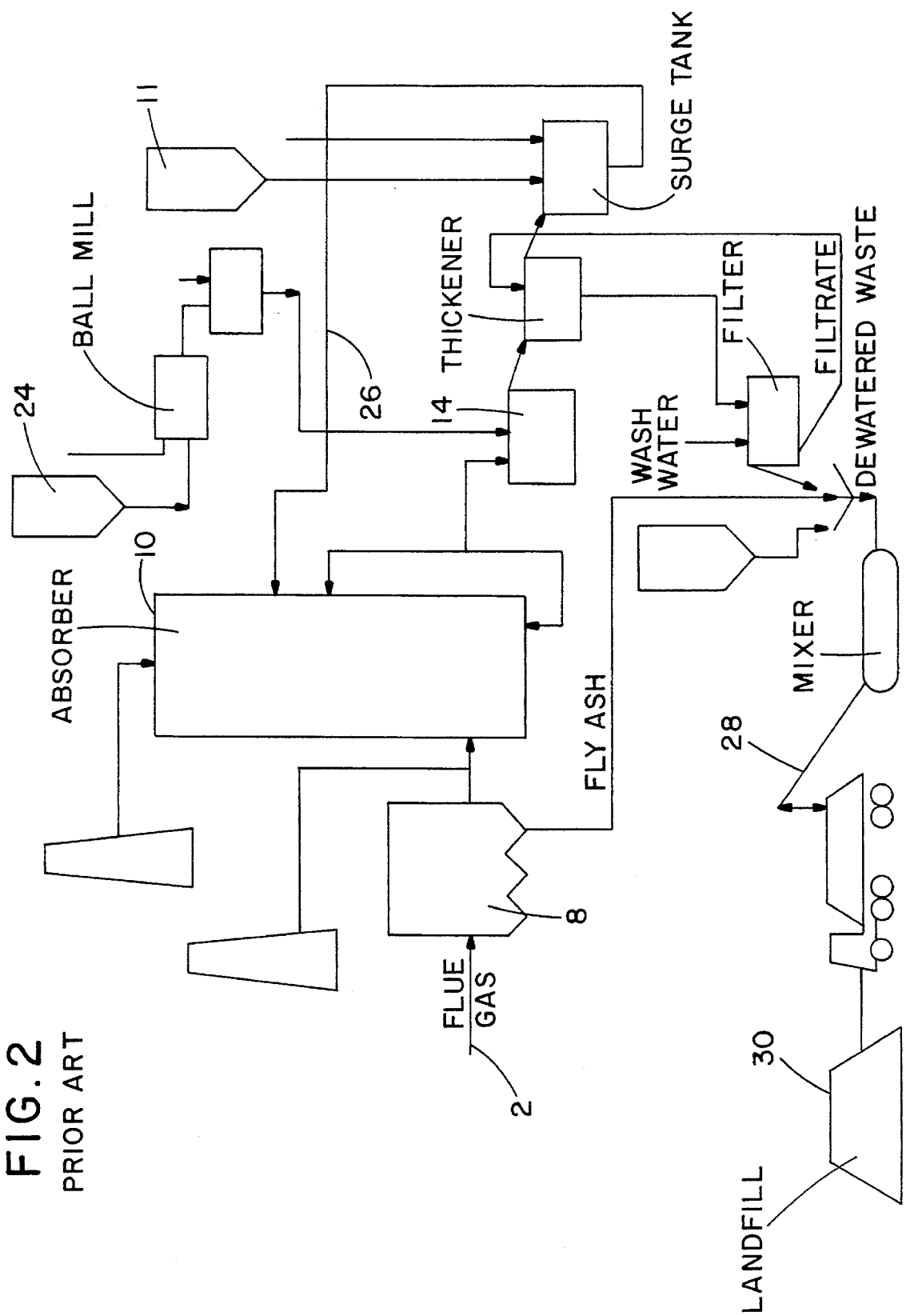
FIG. 2 is a schematic view illustrating a second known regeneration process for the desulfurization of flue gas.

The same reference numerals are used to indicate the same or similar features or elements. FIG. 2 illustrates a dual-alkali system which utilizes a limestone source 24 and a soda ash source 11 which are used in conjunction with a reaction tank 14 which provides reagent to the absorber 10. A regeneration return 26 is used to channel regenerated reagent back into the absorber 10. A by-product of this system, is sludge 28, which is removed from the system and provided to a landfill 30.

Most of these regeneration processes, such as those listed above, are currently practiced at the adiabatic saturation temperature as the gas is cooled from about 300° F. (250°–400° F.) to about 125° F. (110°–150° F.). The absorption of $SO_2$ is dependent upon vapor liquid concentration at that temperature. Therefore, lowering the temperature results in higher absorption of $S_2$.

In addition, gas cooling in a CHX system has a significant beneficial effect on the steam requirements in the stripping process when scrubbing the gas below saturation temperatures. The reduced scrubbing temperature results in lower $H_2O$ concentration in the flue gas and therefore reduces the ratio of $H_2O/SO_2$ vapor pressure in solution from the absorber.

Gas cooling also enhances the $SO_2$ mass transfer. Absorber cooling from 131° F. for example to 95° F. will reduce steam requirements of the steam stripper by almost a factor of three. In the regeneration step, the solution evaporates crystallizing sodium sulfite in one stage only in a $SO_2$ stripping operation. Heat recovery from other overhead product $SO_2$ includes the condensation of water. Heat recovery from the condenser can result in substantial energy savings. It was reported that with process alternatives for stack gas desulfurization with steam regeneration to produce $SO_2$, by G. T. Rochelle, University of Texas EPA Symposium FGD, Nov. 1977, at atmospheric pressure, 90% of the water in the steam stripper can be condensed at about 200° F.

Now, turning to the present invention, as shown in FIG. 3, the present invention is a combined regenerative scrubber and condensing heat exchanger system, generally designated 40, which removes $SO_2$ from flue gas 2 while drawing heat from the flue gas 2 for cooling the flue gas 2.

The flue gas 2 is channeled in an inlet 33 of a housing 32 wherein the flue gas 2 is channeled downwardly through a first condensing heat exchanger 42 which cools the flue gas just above the dew point. The flue gas 2 is channeled through a transition section 43 which leads to a second heat exchanger 44. The flue gas 2 reaches its saturation point as it flows from transition section 43 upwardly through the second heat exchanger 44 which provides a further cooling of the flue gas 2. At the second heat exchanger 44, a scrubbing solution 49 consisting of make-up, reagent 48, regenerated reagent 51, and reaction product stream 47 is sprayed on top of the second heat exchanger 44, i.e. on top of the Teflon heat exchanger tubes, which also performs as a scrubbing contact surface. As the flue gas 2 cools, condensation occurs on submicron size particulates which enhances their removal. The make-up reagent 48 is provided to a scrubbing solution supply tank 50 which is, in turn, mixed in tank 50 to form scrubbing solution 49 which is pumped to sprayers 52 located at various locations within the housing 32. The atomized sprays, which contain recycled reaction products and alkaline reagent 48, sprayed by spray devices 52, ensure required $SO_2$ removal from the flue gas 2 along with fine particulate and condensed vapor removal.

Heat exchanger 44 utilizes a cooling medium 41, which is a cooling fluid, water, air or other suitable cooling means. After reagent spray device 52 sprays the flue gas 2 which removes $SO_2$ from the flue gas 2 by creating a reaction product, as well as spraying the second heat exchanger 44, the flue gas 2 is channeled through a mist. eliminator 54 which demistifies the flue gas 2 prior to exiting the housing 32 through outlet 34. Effluent stream 58 consisting of any excess reagent and reaction products can be provided through the first heat exchanger 42 as the cooling medium or sent directly to the regeneration tank 46.

A regeneration tank 46 is used in conjunction with an alkali reclamation device 56 in order to recover reagent 48 from the reaction product as well as separate $SO_2$ from the reaction product.

Since heat is removed in both the first and second stage, heat exchangers 42 and 44, the liquid to gas reactions, such as those previously mentioned, occur below the adiabatic saturation temperature. Because $SO_2$ solubility increases with lower temperature, the $SO_2$ removal increases for the same chemical conditions. Alternatively, the $SO_2$ removal can be held constant by allowing the chemistry, i.e. pH and $HSO_3$ concentration, to change. This drives reaction to the right for both cases, thereby reducing the heat requirements of Reaction 3 and promoting the reactions that occur in Reactions 4 and 5 for dual alkali.

Scrubbing solution 48 is provided either directly through the first heat exchanger 42 or indirectly through a heating loop which allows for heat to be recovered from the flue gas 2 and is used as a pre-heating means for the effluent stream to regeneration tank 46. This significantly reduces heat input requirements for regeneration and/or promotes dual-alkali reactions.

The alkaline reagents used include: sodium carbonate, sodium sulfite, magnesium oxide, potassium oxide, sodium hydroxide, magnesium sulfite, ammonium hydroxide, and other soluble alkali compounds and dibasic acid, formic acid, and other aqueous buffers, etc. Organic reagents such as amines, and citric acid can also be used wherein they are regenerated by steam stripping and reused. Double alkali systems using sodium scrubbing and regenerating such as with lime or limestone is another alternative.

The regeneration could also be accomplished by an electrolyzing process as disclosed in U.S. Pat. No. 5,098,532, Thompson et al. In this process, ammonium sulfate and sodium hydroxide are produced from an aqueous sodium sulfate solution. The present invention allows for adjusting the temperature and concentration of the electrolyzing process for optimization.

There are many advantages to the present invention which include: high $SO_2$ removal efficiency 90–98%+ that is accomplished with low energy consumption (low L/G, low steam consumption for $SO_2$ stripping; the process is easy to adopt for industrial scale units for producing marketable byproducts such as $SO_2$ or $H_2SO_4$; landfilling is not required (except for dual-alkali without gypsum production); there is also low water concentration in exit gas which reduces visible plume; the second stage heat exchanger also acts as a mass transfer device; the make-up water requirement is low as the condensate from the first stage (CHX) can be used for the scrubber; the stack height requirement is minimized for low pollution emission dispersion; the scrubber tower cost is minimum as the Teflon or corrosion resistant material is already used in the heat exchanger surface; reduced wet/dry interface problem as is experienced with conventional scrubber designs; no scaling of gypsum and minimum erosion is encountered in the scrubber system; the present invention also can be used with several readily available reagents; dual-alkali reaction rates are increased; the heat recovery provided decreases operating costs; salable byproducts are produced, e.g. $SO_2$, $H_2SO_4$, ammonium sulfate, gypsum; some latent heat as well as sensible heat is recovered from the process which increases fuel efficiency; and there is low reagent cost due to regeneration.

While specific embodiments of the invention have been shown and described in detail to illustrate the application of the principles of the invention, it will be understood that the invention may be embodied otherwise without departing from such principles.

What is claimed is:

1. A system for removing $SO_2$ from a flue gas comprising:

a housing having an inlet and an outlet for channeling the flue gas into and out of the housing;

first heat exchanger means in the housing near the inlet for contacting a downward flow of the flue gas in order to cool the flue gas to a temperature above a dew point of the flue gas, the first heat exchanger means having a first cooling fluid passing therethrough;

second heat exchanger means in the housing near the outlet for contacting an upward flow of the flue gas in order to further cool the flue gas, the second-heat exchanger means having a second cooling fluid passing therethrough;

a transition section between the first and second heat exchanger means for channeling the flue gas from the first heat exchanger means to the second heat exchanger means;

reagent scrubbing means for spraying a scrubbing solution as the flue gas enters and exits the second heat exchanger means to remove $SO_2$ from the flue gas with a reagent in order to form reaction products;

regeneration means connected to the transition section for regenerating the reagent from the reaction products for use in the reagent scrubbing means and for recovering the $SO_2$ from the reaction product; and means for supplying an effluent stream which includes excess reagent and reaction products to the first heat exchanger means as the first cooling fluid and then to the regeneration means, the first cooling fluid being heated by the flue gas to supply heat to the regeneration means.

2. The system according to claim 1, including a mist elimination means near the outlet for removing mist from flue gas.

3. The system according to claim 1, wherein the reagent generation means comprises an electrolyzing regeneration means.

* * * * *